July 17, 1923.
S. A. SLAUSON
1,461,882
AUTOMATIC CLAMP BOLT
Filed April 13, 1922
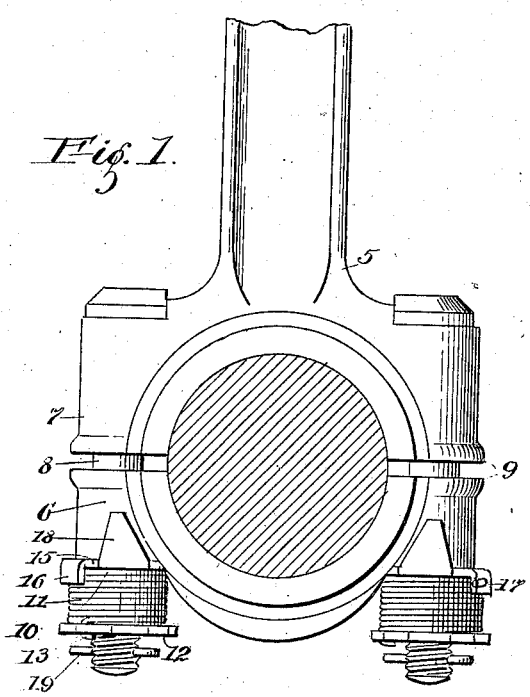
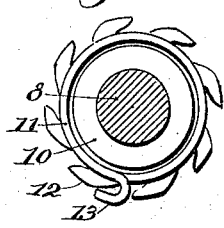
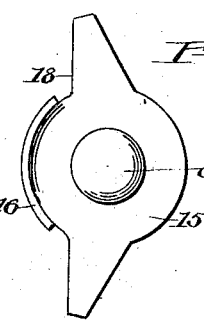
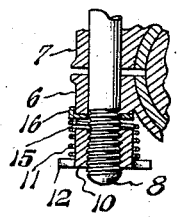
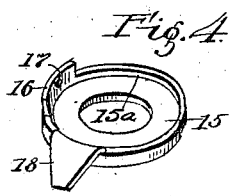

Patented July 17, 1923.

1,461,882

UNITED STATES PATENT OFFICE.

STEPHEN A. SLAUSON, OF CEDAR RAPIDS, IOWA, ASSIGNOR OF TWENTY-FIVE ONE-HUNDREDTHS TO JOHN H. BROCKMAN AND TWENTY-FIVE ONE-HUNDREDTHS TO L. O. HATCH, BOTH OF CEDAR RAPIDS, IOWA.

AUTOMATIC CLAMP BOLT.

Application filed April 13, 1922. Serial No. 552,337.

*To all whom it may concern:*

Be it known that I, STEPHEN A. SLAUSON, a citizen of the United States, residing at Cedar Rapids, in the county of Linn and State of Iowa, have invented certain new and useful Improvements in Automatic Clamp Bolts; and I do hereby declare the following to be a full, clear, and exact description of the invention, such as will enable others skilled in the art to which it appertains to make and use the same.

This invention relates to the adjustment of two or more connected members by bolts and nuts the connecting-rod bearings of motor vehicle engines, and the object of the invention is to provide improved means for automatically taking up any lost motion in such bearings, and holding their adjustment to a snug, but smoothly working fit regardless of wear thereon.

The invention is fully disclosed in the description and claims following, reference being had to the accompanying drawing, in which:—

Fig. 1 is an elevation of mechanism embodying my invention, the connected shaft being in section. Fig. 2 shows a section of one of the fastening bolts of the bearing, the nut therefore, as seen from its inner side, and the attached take-up spring. Fig. 3 shows the threaded end of the bolt, and the anchor-plate for the take-up spring, the holding lugs of the plate being extended in the plane of the body of the plate. Fig. 4 shows a modified form of anchor-plate. Fig. 5 is a longitudinal sectional view of the bolt and its connections, assembled.

In the drawing, the numeral 5 denotes a crank connecting-rod, such as is in common use in automobile engines. This has the outer, detachable and adjustable half-box 6 secured to the main half-box 7 by a pair of bolts 8. The common practice is to leave an initial gap 9 between the boxes, but to fill the interspaces with shims, the thickness of which must correspond very nicely with the tightness desired in the bearing, since the boxes are drawn to a fixed position by the tightening nuts. Any adjustment thus obtained is temporary in character, and sooner or later the bearings wear loose enough to produce the unpleasant and detrimental "knocking" incident to such a condition. In my improved device the gap is left open, as shown, which not only allows for the necessary take-up as the bearing wears, but secures its perfect lubrication. The connecting bolts may be of the regular type, but special nuts 10 each have a cylindrical body to receive a little loosely a coil spring 11, and an annular series of hooks 12 to engage a hook 13 at one end of the spring. The other end of the spring connects by a hook with an anchor-plate 15, which serves as a washer under the nut. The plate is formed with a stiffening rib 16, pierced at 17 for the spring-hook, and with lateral wings 18, which are bent to embrace the end portion of the half-box through which the bolt passes, as clearly shown in Fig. 1. In practice it is preferable to leave the wings flat, as shown in Fig. 3, until the plate is placed in final position, and the nut tightened, when the wing may be bent over with a hammer, and so fit any size of box-end. This provides a very simple and easily applied device for connecting one end of the spring with a stable member of the bearing, and dispenses with any connection thereof with the bolt, which may be of the regular standard type, as above noted. Once properly connected there is no danger of detachment of the spring, which would liberate the nut, but as there is always the possibility of a spring breaking, wherever placed, the nuts are held from detachment from the bolts by cotter-pins 19.

To assemble and adjust it is only necessary to turn the nuts (with springs thereon, one end connected with the anchor-plate) fairly tight with the fingers, bend up the wings to fit snugly on the bearing, and then draw the free end of each spring a turn or more, and hook it to the nut. Assuming that the tension of the spring is correct for the required duty, the bearing will be held with a gentle pressure against the shaft, and the possibility of "knock" from a loose bearing eliminated indefinitely.

In Fig. 4 is shown a modification of the anchor-plate. In this figure but one wing 18 is shown, since one is sufficient to hold the plate in position, though two are preferable. It is desirable, however, to relieve the threads of the bolt from the strain and wear of the anchor-plate, due to side-draft from the spring. This lateral wear may be removed from the bolt, by seating the cylindrical portion of the nut in a shallow socket in the anchor-plate, by flanging it up at 15ª as shown. The side-strain on the anchor-plate is thus transferred to the nut, and any detrimental cutting or wear on the bolt-threads is avoided.

The construction is such as to admit of its attachment to almost any connecting-rod without any machine work, and by any moderately skilled operator. It is also quite as useful on new engines as old ones, because the best fitted bearing is not perfect until it has "worn to a bearing," and in so doing it may easily wear enough to require re-adjustment. With this device in use the adjustment is automatic, and there is never any looseness to cause a knock or chatter in the bearing.

While designed primarily for the specific purpose above indicated, the device is applicable to many other purposes where a bolt is required to hold parts more of less tightly in a definite position, and especially where the parts are subjected to vibration.

Aside from its function as a stiffening rib and holder for one end of the spring, the part 16 serves the useful purpose of confining the spring as it unwinds, and thus prevents it from projecting far enough outwardly to catch on the wall of the crank-case, when space therein is limited.

Having thus described my invention, I claim:

1. Combined with members to be connected, a retaining bolt, a nut therefor adapted for adjustable connection of a spring therewith, an encircling spring, and an anchor-plate having projections to engage one of said members, and adapted to connect with one end of the spring.

2. As a new article of manufacture, an anchor-plate of bendable material, having a washer-like body, laterally extending wings, and a pierced lug for connection with a spring.

3. As a new article of manufacture, the described anchor-plate having a washer-like body, laterally extending wings, and a segmental, marginal stiffening rib, pierced for connection with a spring.

4. As a new article of manufacture, an anchor-plate, having a washer-like body, socketed to receive the end of a nut, one or more lateral holding wings, and a marginal rib pierced for connection with a spring.

In testimony whereof I affix my signature in presence of two witnesses.

STEPHEN A. SLAUSON.

Witnesses:
F. W. ARMSTRONG,
D. L. WOOD.